United States Patent [19]

Bozso et al.

[11] Patent Number: 5,734,764
[45] Date of Patent: Mar. 31, 1998

[54] METHOD AND APPARATUS FOR ACHIEVING A FULLY-CONNECTED NONBLOCKING OPTICAL CROSSBAR SWITCH HAVING WIDE TRANSFER PATHS AND MINIMAL LATENCY BY EXPLOITING THE TRANSPARENCY OF SILICON AT SELECTED WAVELENGTHS

[75] Inventors: Ferenc Miklos Bozso, Peekskill, N.Y.; Philip George Emma, Danbury, Conn.

[73] Assignee: International Business Machines Corporation, Armonk, N.Y.

[21] Appl. No.: 711,642

[22] Filed: Sep. 10, 1996

[51] Int. Cl.[6] .................................. G02B 6/35
[52] U.S. Cl. ............................ 385/17; 359/117
[58] Field of Search ..................... 385/15–23, 49, 385/50, 134, 135; 359/117, 128

[56] References Cited

U.S. PATENT DOCUMENTS

| | | | |
|---|---|---|---|
| 4,653,849 | 3/1987 | Boirat et al. | 385/17 |
| 4,653,850 | 3/1987 | Boirat et al. | 385/17 |
| 5,009,477 | 4/1991 | Alferness et al. | 385/17 |
| 5,274,487 | 12/1993 | Fujimoto et al. | 359/117 |

*Primary Examiner*—John D. Lee
*Attorney, Agent, or Firm*—Whitham, Curtis, Whitham & McGinn; Robert P. Tassinari

[57] ABSTRACT

A fully-connected nonblocking optical crossbar switch with minimal latency for interconnecting a plurality of sources to a plurality of destinations uses an array of photoemitters for each source and corresponding arrays of photodetectors that operate in a wavelength range for which silicon substrates are transparent. The crossbar switch includes a plurality of stacked silicon planes, each plane having an array of photodetectors occupying a unique location on its corresponding silicon plane so that no array of photodetectors blocks another array of photodetectors in the stacked silicon planes. The planes in the stack have varying lengths with a projecting edge of each plane having input/output pads for connecting electrical wiring to photodetectors of the plane. The stacked planes are arranged so that the input/output pads of each projecting edge are exposed for connection to an electrical bus. A plurality of light sources produce light signals representing data from the plurality of sources. An optical fiber bundle interconnects the light sources with photodetector arrays in the stacked silicon planes.

22 Claims, 10 Drawing Sheets

▨ —Platinum

| ⟨⟨⟨⟨⟩ | Optical Fiber Bundle (Entity Output) |
| ⟨⟨⟩ | Wire Bus (Entity Input) |
| —— | Selection Control from Entity |

FIG.10

METHOD AND APPARATUS FOR ACHIEVING A FULLY-CONNECTED NONBLOCKING OPTICAL CROSSBAR SWITCH HAVING WIDE TRANSFER PATHS AND MINIMAL LATENCY BY EXPLOITING THE TRANSPARENCY OF SILICON AT SELECTED WAVELENGTHS

BACKGROUND OF THE INVENTION

1. Field of the Invention

The present invention generally relates to the interconnection of communicating entities such as processors in a multiprocessor system or multiple processors and multiple memory modules and, more particularly, to a fully-connected nonblocking optical crossbar switch having wide transfer paths and minimal latency.

2. Background Description

It is well understood that a nonblocking full-crossbar switch yields the best system-level performance, but the cost of the general implementation has been prohibitive. A nonblocking full-crossbar allows every one of n processors to simultaneously receive data from any of the other n−1 processors.

The complexity of doing this is proportional to n×(n−1); i.e., each of the n processors must have a bus to each of the other (n−1) processors. Note that if a bus is k-bits wide, then the number of physical bit interconnections and wires is k×n×(n−1). For example, in a 16-way multiprocessor having quadword (where a word is 32-bits or 4-bytes) busses, this amounts to over 30,000 wires and pins that have to be interconnected (more specifically, 30,720 wires and pins).

In general, the number of destinations does not necessarily have a direct relationship to the number of sources. Thus, for a specific communication application, a crossbar switch may be used to interconnect n sources with m destinations, where m is not a function of n.

Since modern chip technology allows for (at best) a few thousand signal pins per chip, this interconnection must be partitioned among many chips. That partitioning generally causes more levels of required interconnection, and yet more chips. A real implementation of such a switch would require tens of chips (perhaps one hundred), and signals would necessarily traverse multiple levels of chips to get from source to destination; i.e., the latency is considerable, and the cost is great.

Practical implementations have compromised from this ideal in two ways. First, general connectivity is sacrificed so that not all combinations of connections are allowed simultaneously (e.g., Omega networks, Banyan networks, Shuffle-Exchange, Butterfly, etc.). Second, the width of the bus is made smaller than ideal. For example, the SP2 uses an Omega network, and provides byte-wide busses.

The first compromise means that sometimes messages must wait for other unrelated messages to conclude just so that a required part of the network becomes available to establish the new connection. The second compromise means that a message comprises more packets, and it ties the network up for more cycles than before. In such systems, certain types of traffic (workloads) saturate the switch, and make the switch the system-level bottleneck.

SUMMARY OF THE INVENTION

It is therefore an object of the present invention to provide nonblocking full-crossbar interconnectivity with minimal latency between a plurality of entities.

It is another object of this invention to provide a nonblocking crossbar switch having wide transfer paths.

It is a further object of this invention to provide the aforementioned features economically with O(n) chips, and a latency that is constant (e.g., not related to n).

It is yet another object of this invention to provide the aforementioned features but to make the switching function even more general; that is, to allow a processor to receive arbitrary dynamically-selected combinations of the bits being broadcast by all processors (e.g., to receive bit i+j from processor i on cycle j for all i and j on each cycle).

In the practice of the invention, the entities might be processors in a system, or they might be processors and memory systems. The nature of the entity will determine the protocol for information exchange. It is not an object of this invention to advocate a particular protocol; rather, the object is to provide robust connectivity whatever the protocol.

According to the invention, an array of photoemitters and an array of photodetectors are used to implement the nonblocking full-crossbar switch. The photoemitters and photodetectors are made to operate in a 1.4–1.6 micron wavelength range, which corresponds to a sub-bandgap photon energy of roughly 0.8 eV (electron volts) for silicon. In this photon energy range, the silicon substrate is transparent, the quantum efficiency of photodetectors is high, and the transmission loss of optical fiber is minimal.

The switch connects n entities with O(n) busses, providing very wide (e.g., quadwords) transfer paths. Specifically, each entity has a single output bus and a single input bus. The full interconnectivity is established in three dimensions via stacking n receiver chips (containing photodetectors) and passing all n output busses through the stack in optical form.

Each entity controls its receiver chip with control information sent on a control bus. Since all n output busses pass through all receiver chips, the full crossbar is established. Furthermore, since all n output busses pass through all receiver chips, the receiver chip can select any subsets of bits from any of the n busses simultaneously.

The selection control can be arbitrarily exotic, and it is not a point of this invention to enumerate all combinations, although the breadth of the invention implicitly includes such combinations. In general, receiver chip j can select bits f(t,j)+g(t,i) from all busses i on every cycle t, where f and g are arbitrary functions that are specified on the control bus coming from each entity.

In addition to specifying selection control to receiver chip j by control bus j (from entity j), some of the selection control for receiver j can be specified by data bus i. This facilitates a direct communication from entity i to entity j. That is, entity i can "address" entity j directly. In essence, what is called "the data bus" coming from entity i may actually include address information and control information.

These various methods for specifying what the connection is at any instant in time are the switching protocols. This invention does not independently claim any existing protocol, but it subsumes all of them. The substance of the subject invention is the three-dimensional full crossbar structure that is obtained by exploiting the transparency of silicon and the quantum efficiency of photodiodes at approximately 1.5 micron optical wavelength.

In general, the invention connects n data sources to m destinations, each source generating a k-bit parallel message. Part of this k-bit parallel message can include a destination address. The optical crossbar switch comprises m stacked silicon planes, each plane having n photodetector arrays and each photodetector array having k photodetector cells. Each photodetector cell is located within a large area of empty silicon and positioned in unique locations such that, when the silicon planes are stacked, no photodetectors on any plane are coincident in position with photodetectors on any other plane. The silicon planes have different lengths and are arranged so that each plane has a projecting edge when the planes are stacked. Each projecting edge has input and output pins. The output pins are connected to circuits on the silicon plane that are responsive to optical signals incident on the photodetectors on the silicon plane. The input and output pins on the projecting edge are connected to an electrical bus external to the stack. There are n×k light sources for producing the k light signals of the k-bit parallel message for each of the n data sources. The light sources generate light in a wavelength range for which silicon is transparent, for which optical fiber is transparent, and for which a photodetector material is responsive to light. An optical fiber bundle containing n×k optical fibers transmits light from the n×k light sources to the top surface of the m stacked silicon planes. m electrical buses connect the input and output pins of corresponding ones of the m silicon planes to one of the m destinations.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
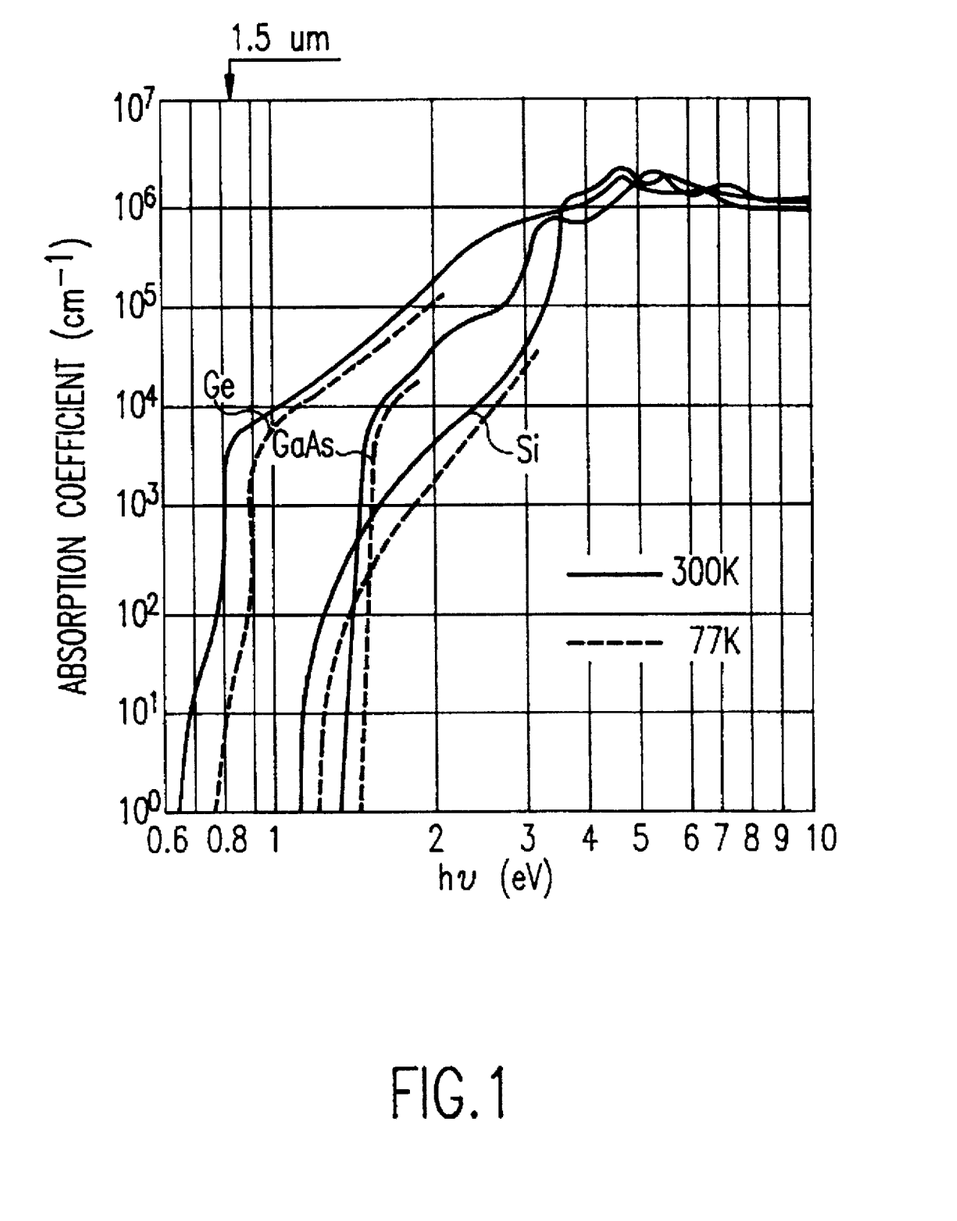
FIG. 1 is a graph showing the absorption coefficients of Ge, Si, and GaAs as functions of photon energy.
Figure 2:
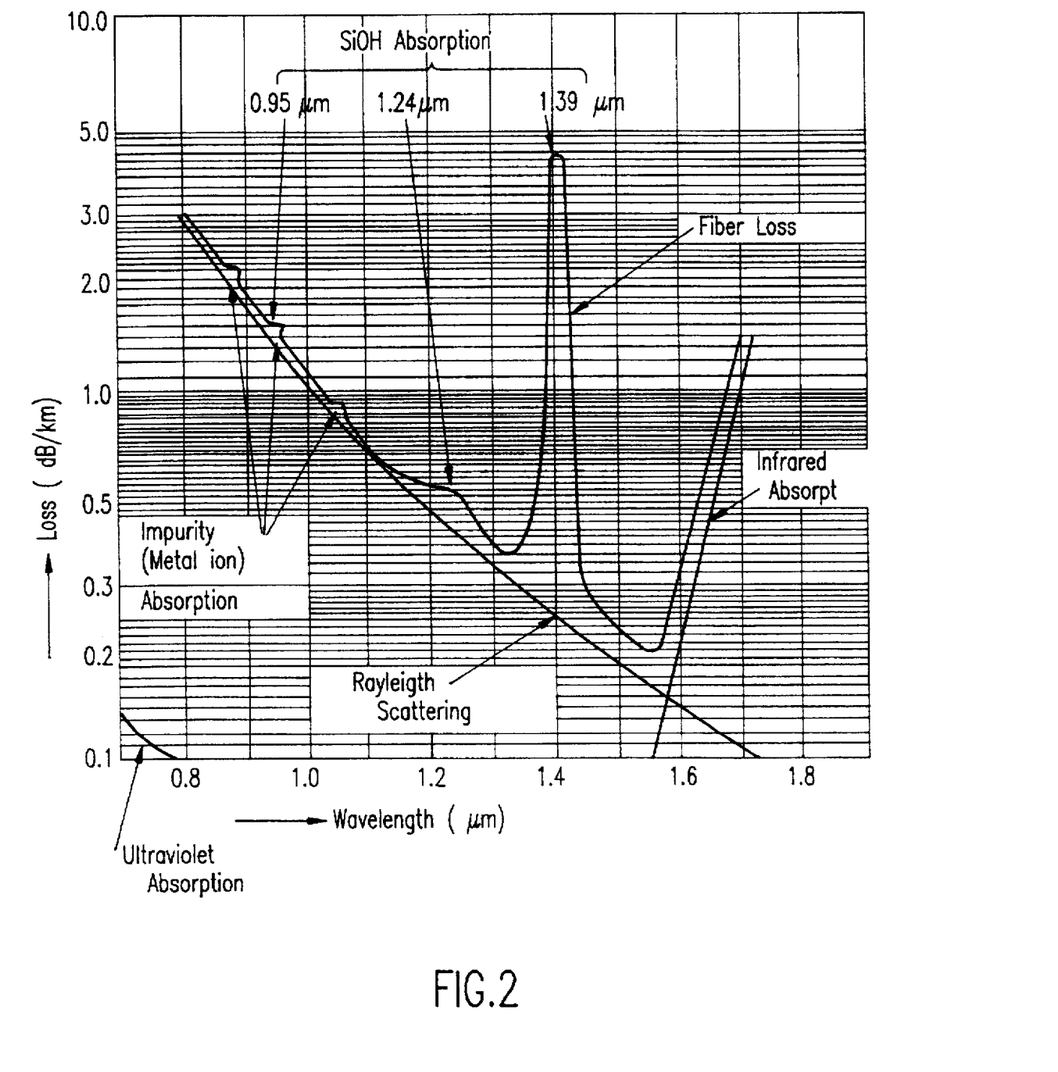
FIG. 2 is a graph showing the transmission loss of optical fiber as a function of photon energy and wavelength.
Figure 3:
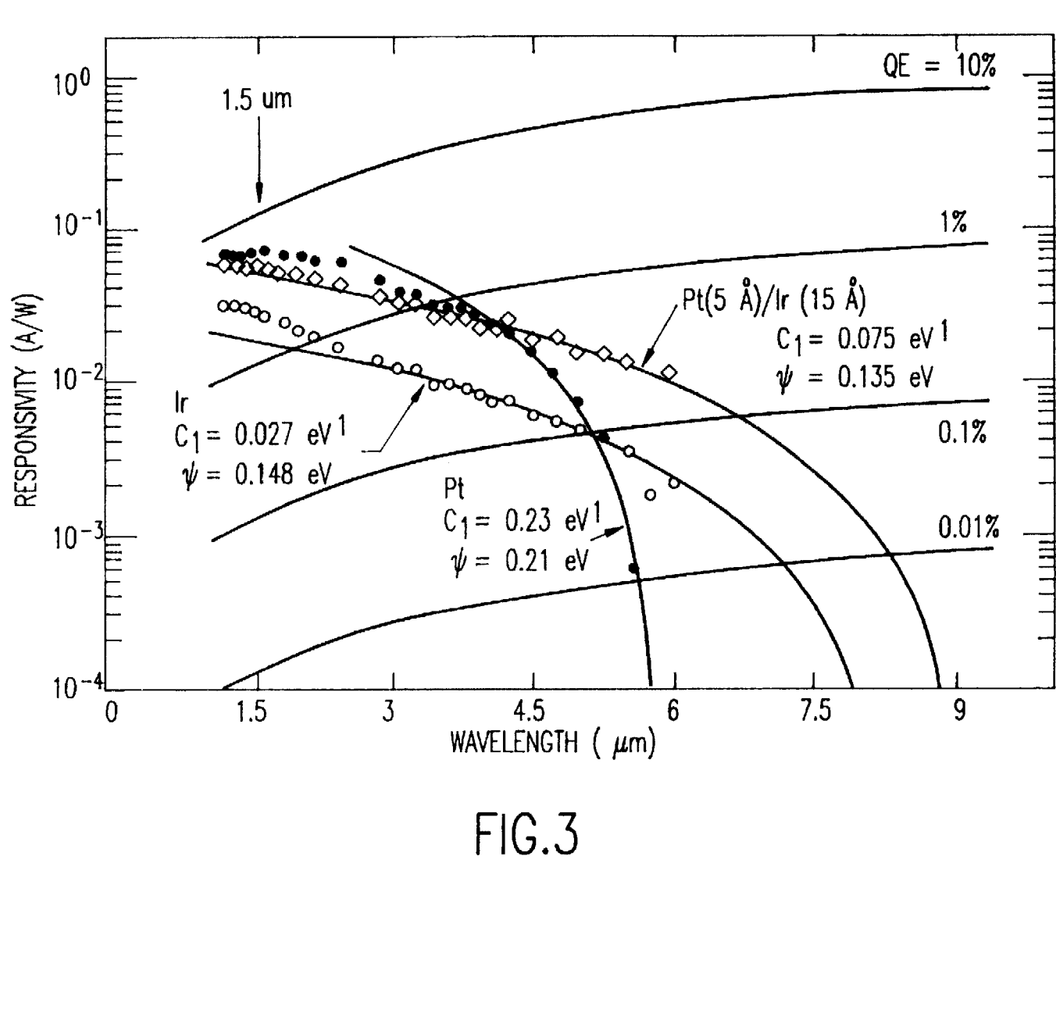
FIG. 3 is a graph showing that at a 1.5 micron wavelength, the responsitivity of Schottky-barrier photodetectors is quite high (>5%)

Referring now to the drawings, and more particularly to FIG. 1, there is shown the absorption coefficients of Ge, Si, and GaAs as functions of photon energy. The absorption of light by silicon is negligible at a 1.5 micron wavelength. FIG. 2 shows the transmission loss of optical fiber as a function of photon energy and wavelength. The loss at a 1.5 micron wavelength is minimal in optical fiber. On the other hand, FIG. 3 shows that at a 1.5 micron wavelength, the responsitivity of Schottky-barrier photodetectors is quite high (>5%).

These three characteristics of 1.5 micron wavelength light indicate that the transmission of light through a fiber, and then through a series of stacked silicon chips having Schottky-barrier photodetectors is feasible. This invention uses these characteristics to create a full-crossbar switch having minimal latency.

In general, a hardware entity communicates with other hardware entities via reading information from a named source (address), or writing information to a named source (address), where the name includes a description of the other entity involved in the communication. The actual data that is transferred generally includes a static portion, and possibly some status information (e.g., a valid indicator or some control information) that aids in the interpretation of the static data and/or the address.

Therefore in general, when an entity "writes to" the system, it provides an address, some control, and some static data. When it "reads from" the system, it provides an address and some control, and it receives static data. These various combinations were generically described in the literature, and they are effected by specifying source and destination addresses via combinations of control sent on control busses to receiver chips, and on output busses to the crossbar switch.

For the sake of illustration, the preferred embodiment is described in terms of an implementation of a crossbar that interconnects sixteen entities. The number sixteen does not imply a limitation of the invention, and those skilled in the art will recognize that other numbers (typically powers of two) can be used in a specific implementation.

Figure 4:
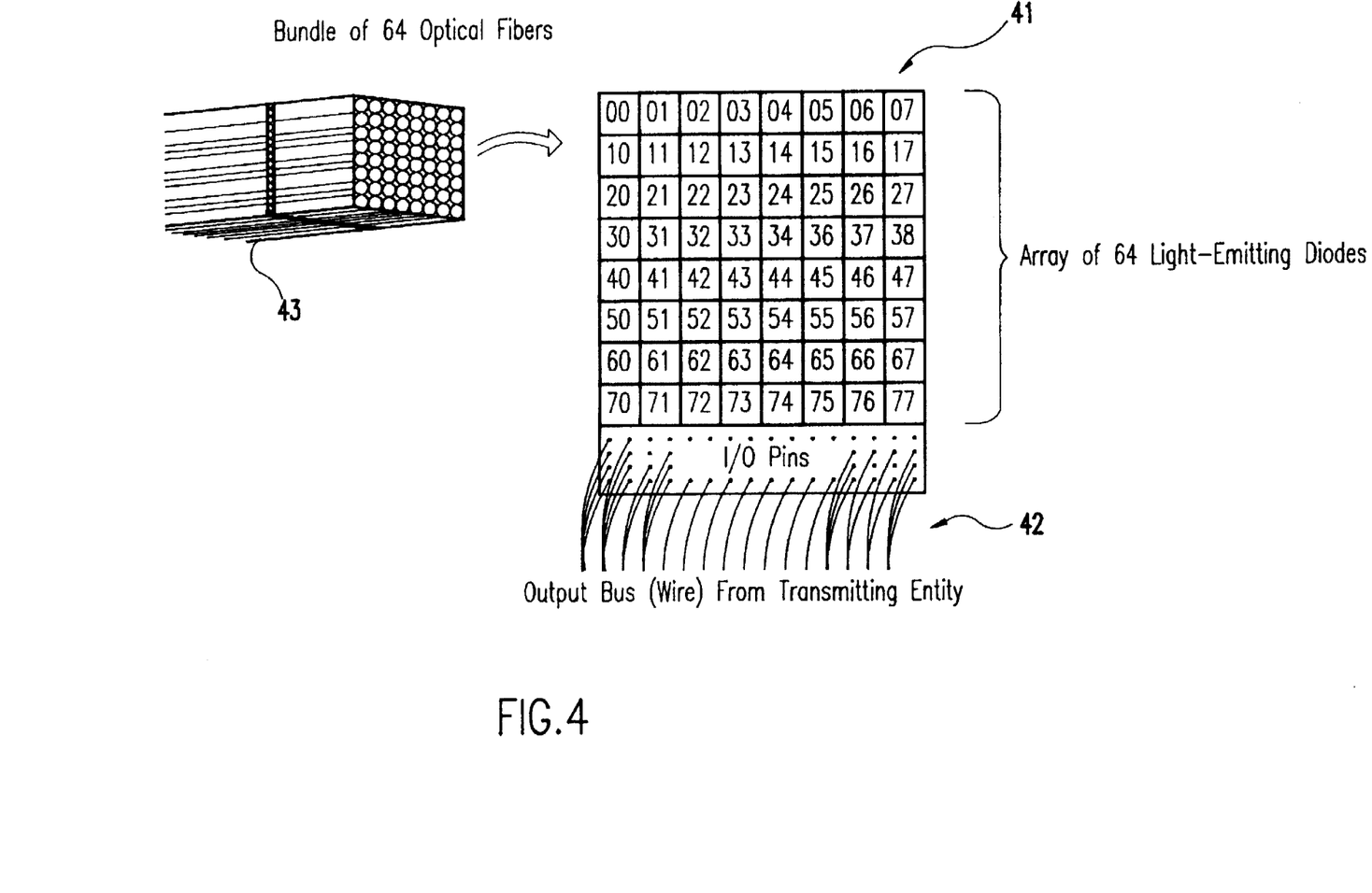
FIG. 4 is a pictorial diagram showing the conversion of an eight byte electrical output bus to an optical bundle.

Each of the entities has an output bus of electrical signals that must be converted into optical signals before being transmitted though optical fiber to the crossbar switch. FIG. 4 shows one means of conversion. In FIG. 4, a simple array 41 of sixty-four light-emitting diodes (LEDs) converts a 64-bit electrical bus 42 (in this case) into sixty-four optical signals. A bundle of sixty-four optical fibers 43 with requisite lenses (not shown) is then put in contact with the LED array 41 as shown in FIG. 4. The collective bundle 43 is then a single cable that goes from the entity to the crossbar switch.

The number sixty-four is not a limitation of the invention, but it is used here for the sake of illustration. Currently, it is possible to purchase commercial fibers that are 100 microns in diameter, and 250 micron fibers are commonplace. Therefore, the bundle of sixty-four bits has a rectangular cross-section that is four square millimeters (4 mm$^2$) assuming 250 micron fibers, at worse, and is as small as 0.64 mm$^2$ for 100 micron fibers.

In this example, sixteen such bundles come together at the crossbar switch, so the area of all sixteen bundles is 0.64 square centimeters (cm$^2$) at worse, and 0.1 cm$^2$ for 100 micron fiber. Silicon chips that easily accommodate this area are commonplace, and it is apparent that 128-bit, 256-bit, 512-bit, or wider busses can also be built without stretching the limits of silicon area.

At the receiving end of each fiber is a small lens to focus the light, and an array of photodiodes that are vertically stacked. Each photodiode comprises a platinum area on top of the silicon surface. The platinum is not transparent to the light, but a 10 micron by 10 micron square of platinum is sufficient for making a reliable photosensor at this energy level.

Figure 5:
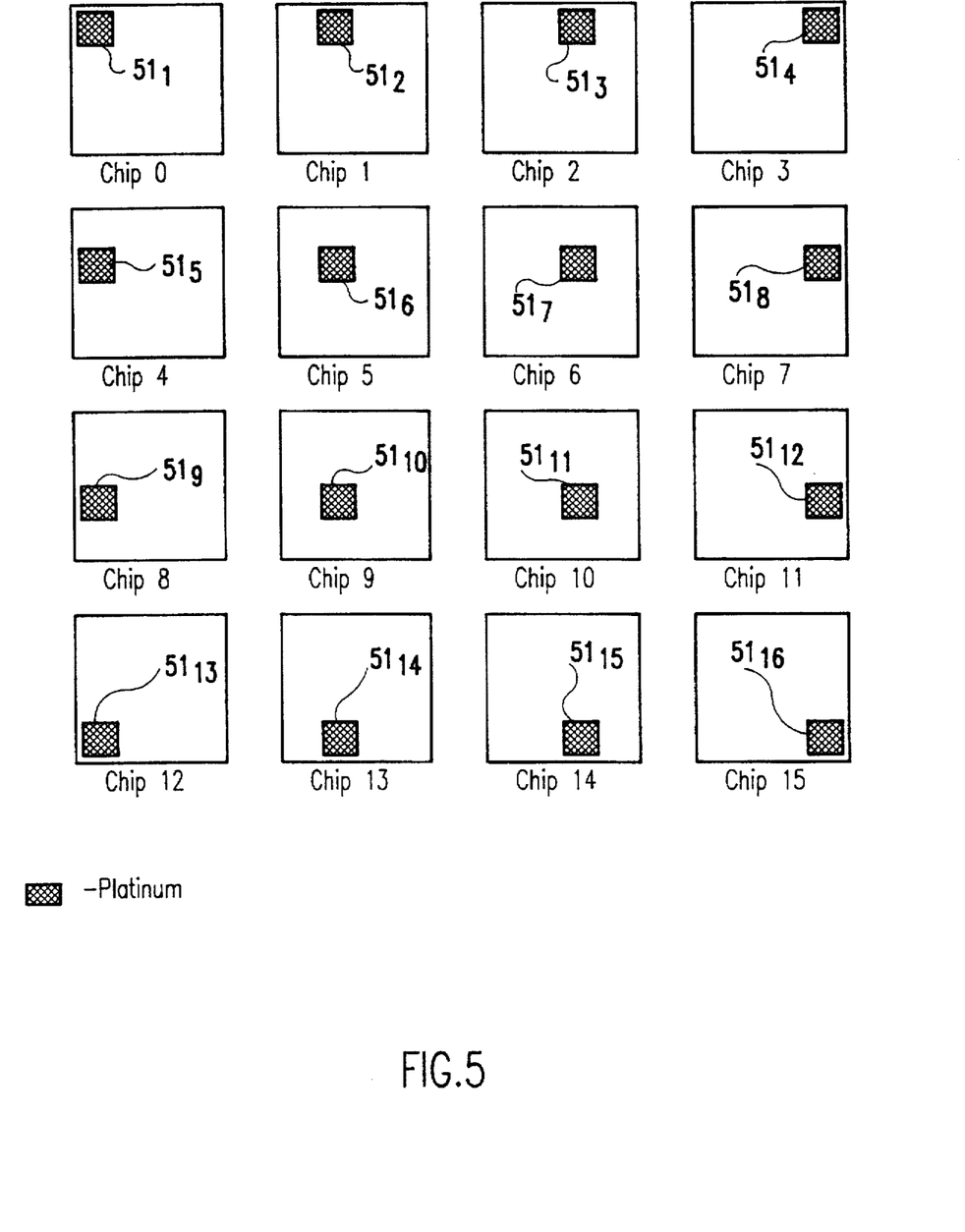
FIG. 5 is a plan view showing the placement of platinum within the total area allocated for a photodiode on each of sixteen receiver chips.

FIG. 5 shows the platinum areas $51_1$ to $51_{16}$ devoted to a single photodiode on each of sixteen chips. These represent the sixteen receiver chips, and the platinum photodiode is placed in a different spot within the allocated area on each chip so that when the chips are stacked together, all sixteen platinum areas will be illuminated by incident light.

Figure 6:
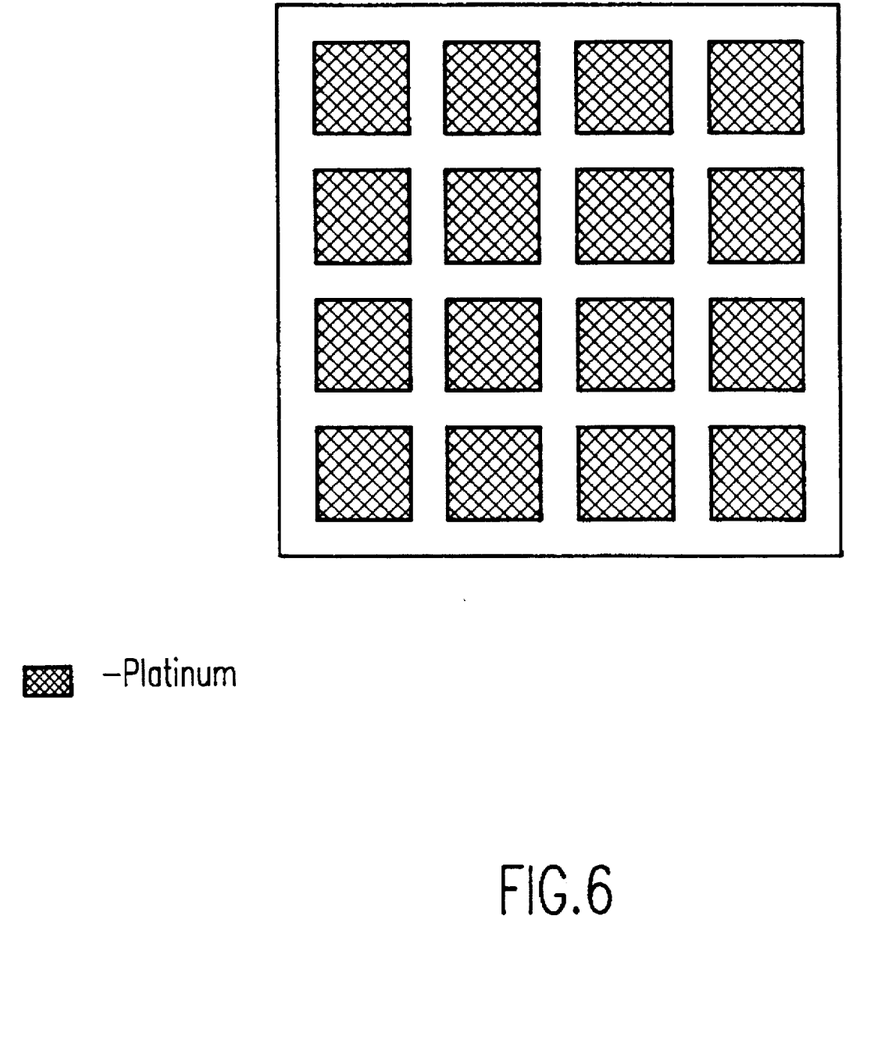
FIG. 6 is a plan view showing the platinum "image" created by sixteen stacked photodiodes.

FIG. 6 shows a top view of one set of platinum photodiodes (corresponding to the same optical-fiber location) for the sixteen chips when they are stacked together. Note that for a 100 micron diameter fiber, the illuminated area is approximately $7.85 \times 10^{-9}$ square meters. Sixteen platinum rectangles that are 10 microns on a side require $1.6 \times 10^{-9}$ square meters which is only 20% of the available area, so the stack is actually much more transparent than is shown in FIG. 6. Therefore, the scheme easily extends to more sources than sixteen; e.g., sixty-four platinum squares occupy 80% of the area of a 100 micron fiber.

Optionally, each photodiode area (the $7.85 \times 10^{-9}$ square meters) can also contain a latch that captures the state of the photodiode on each cycle for synchronous switch operation.

Figure 7:
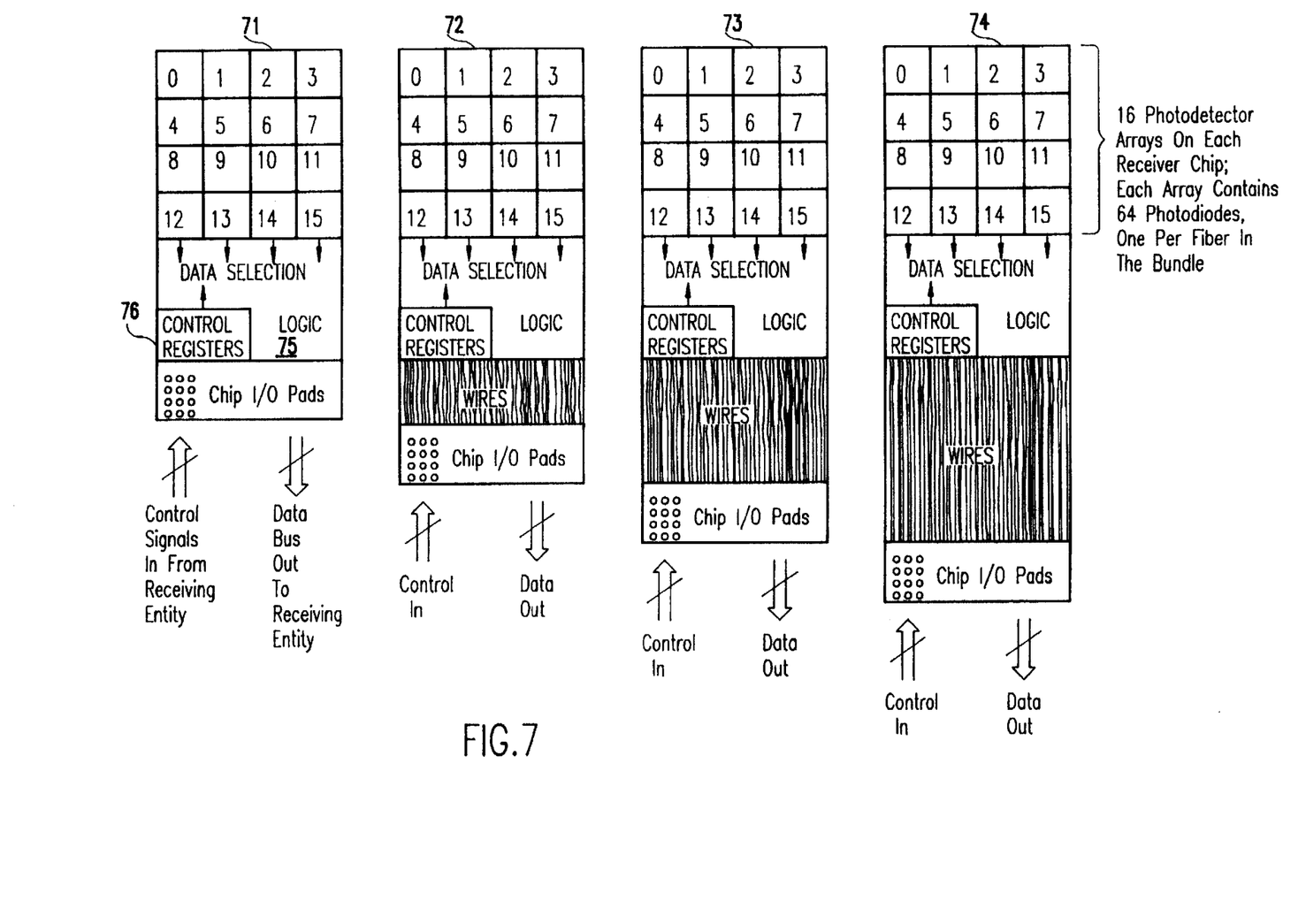
FIG. 7 is a block diagram showing four receiver chips.

FIG. 7 shows four receiver chips 71 to 74. Note that each receiver chip has sixteen arrays of photodetectors, and each of the sixteen arrays has sixty-four photodiodes as previously described. Therefore, sixteen bundles of sixty-four fibers each are used to illuminate each receiver chip. Each fiber must have an integrated lens at the end to focus the light so that it does not disperse.

Each chip has a section of logic 75 that can select from the $16 \times 64 = 1024$ signals that come in on the fibers. The entity that receives data from a receiver chip controls that chip via some control inputs that it provides to the receiver chip. The receiver chip contains state registers 76 that retain control information, and other state information. As described in the background of the invention, signals that come in on the optical fiber can also be used as control information that determines what other signals are selected.

The selection logic 75 on each receiver chip selects a subset of the optical inputs on each cycle (perhaps latched as described above), and it routes them in electrical form to input/output (I/O) pins at the edge of the chip. The only difference between the four chips is that each is a slightly different length so that when the chips are stacked together, all of the electrical I/O pins are accessible.

Figure 8:
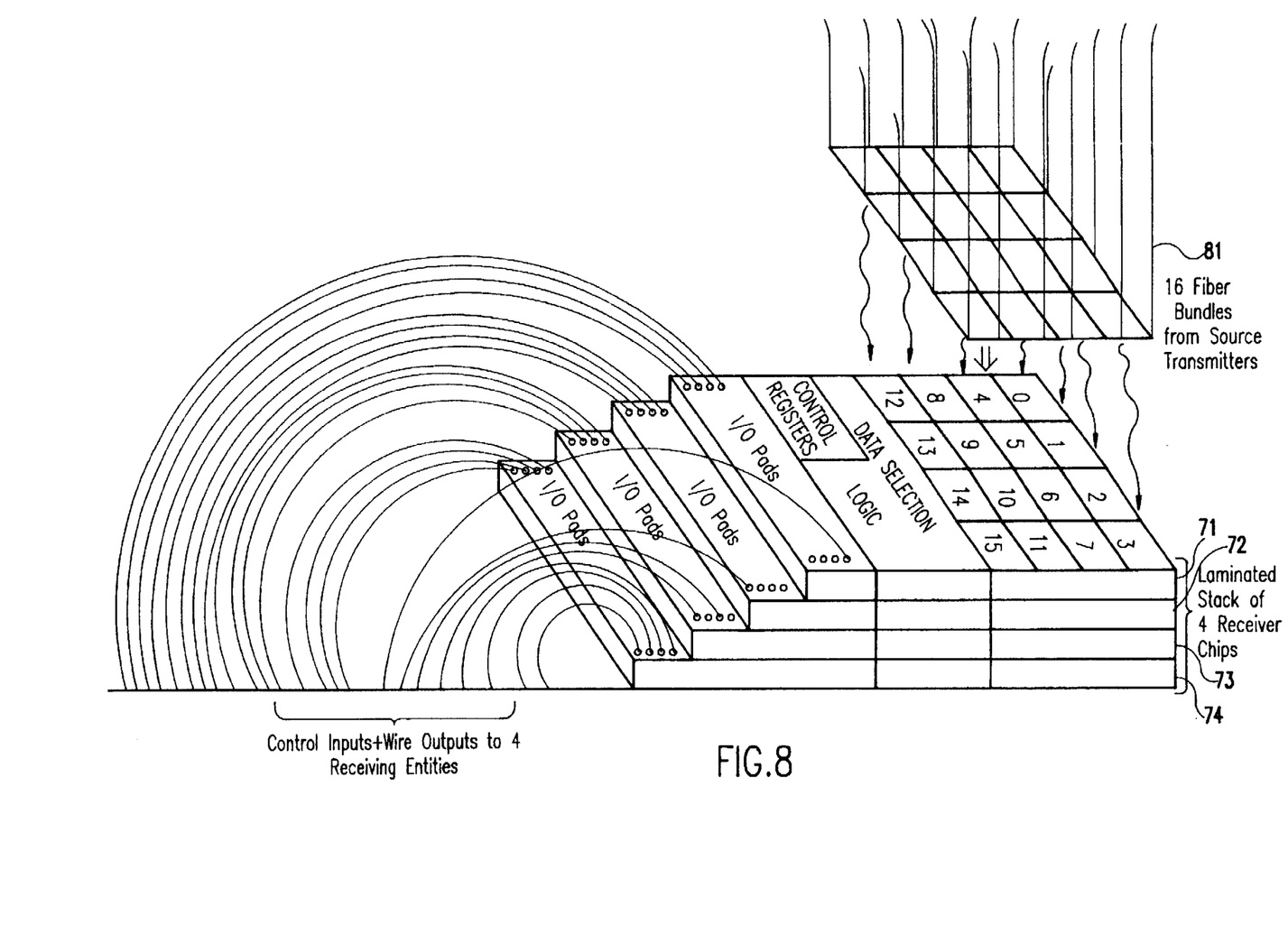
FIG. 8 is a pictorial diagram showing a stack of receiver chips.

FIG. 8 shows the four chips 71 to 74 from FIG. 7 stacked together, and the sixteen optical-fiber bundles 81 incident on the top of the stack. Since the chips are different lengths, all electrical I/O pins on all four chips are exposed, and can be wire-bonded to a second-level substrate.

Figure 9:
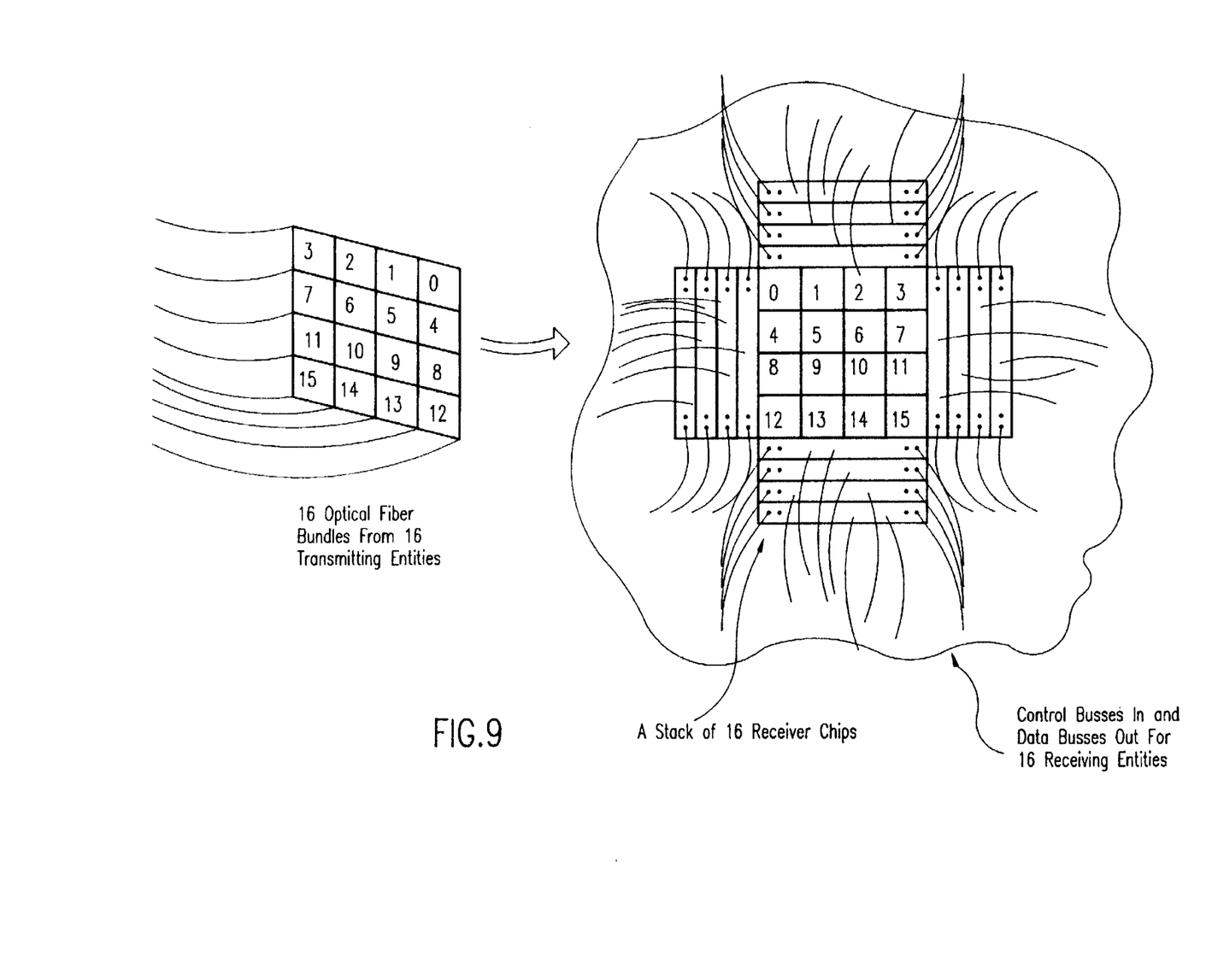
FIG. 9 is a pictorial diagram showing a full crossbar switch.

FIG. 9 shows the full crossbar switch that is built (in this case) by orienting four substacks of four chips each (as taken from FIG. 8) in the north, south, east, and west (N, S, E, and W) directions, and then stacking the four substacks into a single 16-chip stack. The electrical I/O pins are available for wire-bonding on all four sides.

Note that the substack in FIG. 8 could have been obtained by orienting the four chips in the N, S, E, and W directions. Also, the sixteen-chip stack could be built by extending the general concept applied in FIG. 8 (i.e., each chip a different length).

Figure 10:
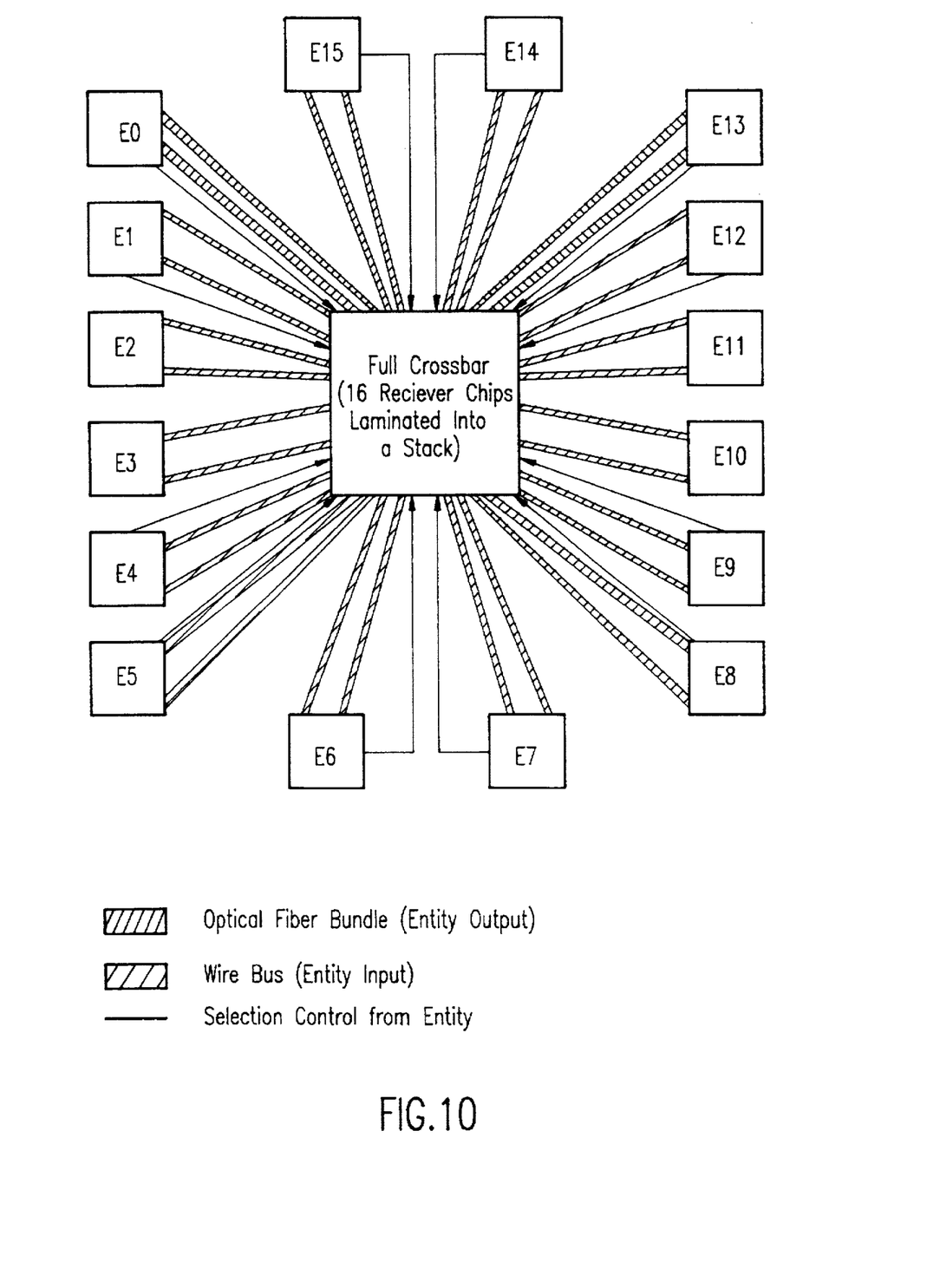
FIG. 10 is a block diagram showing sixteen entities connected in a full crossbar switch with O(n) bus.

FIG. 10 shows the system that includes the sixteen entities that are interconnected by the full crossbar of FIG. 9. Each entity provides control information to the crossbar, and sends a bundle of optical data signals to the crossbar. Each entity receives a bus of electrical signals from the crossbar.

The crossbar switch of FIG. 9 is a physical stack of sixteen silicon chips. The latency through the crossbar is merely the latency through the selection logic on the receiver chip. This could be a single cycle, or even zero cycles (i.e., no latchpoint).

The crossbar switch of FIG. 10 is a full crossbar switch that is nonblocking, and that allows for the arbitrary selection of any signals in the entire system by all entities simultaneously and independently. The crossbar truly has minimal latency and maximum bandwidth. It is directly wired by a single bus to and from each entity in the system, therefore the busses can be very wide.

For example, with seventeen millimeter chips and 100 micron fibers, the system can simultaneously transport over 32K signals per cycle. This allows thirty-two entities to be interconnected through the crossbar by 1K bit busses. At a very conservative bus speed of five nanoseconds, this allows for a system-level bandwidth of roughly 820 GBytes/sec.

In the preferred embodiment, electrical output signals are converted to optical signals within a transmitting entity, and are sent to crossbar switch in a fiber bundle. At the receiving end of each fiber, the light that is emitted acts as a point source, so each fiber must be terminated with a lens that collimates the light so that it is normally incident on the silicon surface.

As the light goes through the layers of silicon, it disperses as it gets further from the source. This dispersion limits the thickness of the stack, much more so than the light absorption. Receiver chips can be ground more thinly if need be. It is straightforward to reduce the thickness of each chip to 0.25 millimeter, so that a stack of sixteen chips is four millimeters.

While the lens technology is certainly available, an alternative means of creating light is via integrated solid-state lasers which will emit collimated light that does not require lenses. This would be done within the crossbar switch in one of two ways.

If the total number of signals (number of entities times the number of bits per output bus) is small enough to be wire-bonded to a single chip, then the entire laser array for the system is built on a single chip, and all output busses from the entities are brought to that chip on electrical wires. That single chip is laminated into the stack of receiver chips.

If there are more signals than can be wire-bonded to a single chip, then multiple chips (e.g., one per processor, or more, or fewer) are used to provide wire-bond capability (as above) with the lasers built on the multiple chips in different areas. The multiple chips are then bonded together to create the effect of the single chip above, and that stack is bonded to the stack of receiver chips.

This makes the entire stack thicker, and the system might be limited by dispersion effects because of the thickness. As mentioned above, all chips can be ground as thinly as possible to mitigate some of this limitation.

While the invention has been described in terms of a preferred embodiment with alternatives in implementation, those skilled in the art will recognize that the invention can be practiced with modification within the spirit and scope of the appended claims.

Having thus described our invention, what we claim as new and desire to secure by Letters Patent is as follows:

1. A fully-connected nonblocking optical crossbar switch for connecting n data sources to m destinations, each source generating a k-bit parallel message, said optical crossbar switch comprising:
   m stacked silicon planes, each plane having n photodetector arrays, each photodetector array having k photodetector cells, each photodetector cell having a photodetector within a large area of empty silicon, said photodetectors on each plane being positioned in unique locations within said large areas of empty silicon so that, when the silicon planes are stacked, no photodetectors on any plane are coincident in position with photodetectors on any other plane, the planes in the stack having varying lengths and being arranged so that each plane has a projecting edge when the planes are stacked, each projecting edge having input and output pins, said output pins being connected to circuits on the silicon plane that are responsive to optical signals incident on the photodetectors on the silicon plane, said input and output pins on a projecting edge being connected to an electrical bus external to the stacked silicon planes;

n×k light sources for producing light signals of the k-bit parallel message for each of the n data sources, said light sources generating light in a range of wavelengths for which the silicon planes are transparent, for which optical fiber is transparent, and for which a photodetector material is responsive to the light;

an optical fiber bundle comprising n×k optical fibers, said optical fiber bundle transmitting light from the n×k light sources to a top surface of the m stacked silicon planes; and m electrical busses, each bus connecting the input and output pins of one of the m planes to one of the m destinations.

2. The fully-connected nonblocking optical crossbar switch for interconnecting n sources to m destinations recited in claim 1 wherein each photodetector cell further includes a latch element that captures a state of the photodetector on each cycle.

3. The fully-connected nonblocking optical crossbar switch for interconnecting n sources to m destinations recited in claim 1 wherein the k-bit message includes a destination address.

4. The fully-connected nonblocking optical crossbar switch for interconnecting n sources to m destinations recited in claim 3 wherein the k-bit message further includes data.

5. The fully-connected nonblocking optical crossbar switch for interconnecting n sources to m destinations recited in claim 1 wherein each of said m stacked silicon planes further includes control logic for specifying which of n×k inputs is connected to outputs on each plane.

6. The fully-connected nonblocking optical crossbar switch for interconnecting n sources to m destinations recited in claim 5 wherein said control logic responds to electrical control signals on input pins to the plane from the electrical bus.

7. The fully-connected nonblocking optical crossbar switch for interconnecting n sources to m destinations recited in claim 5 wherein said control logic responds to a subset of the n×k input light signals.

8. The fully-connected nonblocking optical crossbar switch for interconnecting n sources to m destinations recited in claim 5 wherein said control logic responds to a combination of electrical control signals on input pins to the plane from the electrical bus and to a subset of the n×k input light signals.

9. The fully-connected nonblocking optical crossbar switch for interconnecting n sources to m destinations recited in claim 5 wherein said control logic comprises:

selection logic interposed between said array of photodetectors and said input and output pins; and control registers connected to said input/output pins for receiving selection data and controlling the connection of said photodetectors in said array of photodetectors to said input and output pins.

10. The fully-connected nonblocking optical crossbar switch for interconnecting n sources to m destinations recited in claim 1 wherein the wavelength of the light signals is approximately 1.5 microns.

11. The fully-connected nonblocking optical crossbar switch for interconnecting n sources to m destinations recited in claim 10 wherein said photodetectors are platinum photodiodes.

12. The fully-connected nonblocking optical crossbar switch for interconnecting n sources to m destinations recited in claim 1 wherein the stacked silicon planes are arranged in a radiating pattern with projecting edges of groups of planes are aligned along different radial angles from a central point of the stacked silicon planes.

13. The fully-connected nonblocking optical crossbar switch for interconnecting n sources to m destinations recited in claim 1 wherein said sources and destinations include fully interconnected processors in a multiprocessor system.

14. The fully-connected nonblocking optical crossbar switch for interconnecting n sources to m destinations recited in claim 13 wherein at least one of said sources and destinations is a memory subsystem in the multiprocessor system.

15. The fully-connected nonblocking optical crossbar switch for interconnecting n sources to m destinations recited in claim 1 wherein k is equal to sixty-four.

16. The fully-connected nonblocking optical crossbar switch for interconnecting n sources to m destinations recited in claim 15 wherein n is equal to sixteen.

17. The fully-connected nonblocking optical crossbar switch for interconnecting n sources to m destinations recited in claim 1 wherein k is equal to one hundred twenty-eight.

18. The fully-connected nonblocking optical crossbar switch for interconnecting n sources to m destinations recited in claim 17 wherein n is equal to thirty-two.

19. A method of providing fully-connected nonblocking crossbar switching between n sources and m destinations wherein each source generates a k-bit parallel message comprising the steps of:

arranging m stacked silicon planes, each plane having n photodetector arrays, each photodetector array having k photodetector cells, each photodetector cell having a photodetector within a large area of empty silicon, said photodetectors on each plane being positioned in unique locations within said large areas of empty silicon so that, when the silicon planes are stacked, no photodetectors on any plane are coincident in position with photodetectors on any other plane, said planes haveing different lengths and being arranged so that each plane has a projecting edge when the planes are stacked, each projecting edge having input and output pins which are exposed, said output pins being connected to circuits on the silicon plane that are reponsive to optical signals incident on the phtodetectors on the silicon plane;

connecting said input and output pins on said projecting edges to an electrical bus external to the stack;

producing n×k light signals representing the k-bit parallel messages from each of the n data sources, said light signals being in a range of wavelengths for which the silicon planes are transparent, for which optical fiber is transparent, and for which a photodetector material is responsive to the light;

connecting said n sources with respective ones of the photodetectors of the stacked silicon planes with an optical fiber bundle comprising n×k optical fibers; and connecting m electrical busses to respective input and output pins of the m stacked silicon planes and to corresponding ones of the m destinations.

20. The method of providing fully-connected nonblocking crossbar switching between n sources and m destinations recited in claim 19 wherein the wavelength of the light signals is approximately 1.5 microns.

21. A multiprocessor system comprising:

n processors, each processor generating a k-bit parallel message; and a fully-connected nonblocking optical crossbar switch for interconnecting said n processors comprising:

m stacked silicon planes, each plane having n photodetector arrays, each photodetector array having k photodetector cells, each photodetector cell having a photodetector within a large area of empty silicon, said photodetectors on each plane being positioned in unique locations within said large areas of empty silicon so that, when the silicon planes are stacked, no photodetectors on any plane are coincident in position with photodetectors on any other plane, the planes in the stack having varying lengths and being arranged so that each plane has a projecting edge when the planes are stacked, each projecting edge having input and output pins, said output pins being connected to circuits on the silicon plane that are responsive to optical signals incident on the photodetectors on the silicon plane, said input and output pins on a projecting edge being connected to an electrical bus external to the stacked silicon planes;

n×k light sources for producing light signals of the k-bit parallel message for each of the n processors, said light sources generating light in a range of wavelengths for which the silicon planes are transparent, for which optical fiber is transparent, and for which a photodetector material is responsive to the light;

an optical fiber bundle comprising n×k optical fibers, said optical fiber bundle transmitting light from the n×k light sources to a top surface of the m stacked silicon planes; and m electrical busses, each bus connecting the input and output pins of one of the m planes to one of m destinations, said optical crossbar switch having minimal latency.

22. The multiprocessor system recited in claim 21 further comprising:

m memory subsystems; and a second fully-connected nonblocking optical crossbar switch identical to the first optical crossbar switch for interconnecting n sources to m destinations wherein the first optical crossbar switch is connected to n processors broadcasting memory requests to the m memory subsystems, and said second optical crossbar switch is connected to the m memory subsystems which respond to the requests by broadcasting the requested data back to the n processors.

* * * * *